(12) United States Patent
Nakabayashi

(10) Patent No.: US 6,334,008 B2
(45) Date of Patent: *Dec. 25, 2001

(54) OPTICAL CIRCUIT AND METHOD OF FABRICATING THE SAME

(75) Inventor: Yukinobu Nakabayashi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,907

(22) Filed: Feb. 11, 1999

(30) Foreign Application Priority Data

Feb. 19, 1998 (JP) .................................. 10-037201

(51) Int. Cl.⁷ .................................................. G02B 6/12
(52) U.S. Cl. .................................... 385/14; 385/2; 385/3; 385/4; 385/8; 385/45; 385/129
(58) Field of Search ................................. 385/14, 2, 3, 4, 385/8, 9, 10, 16, 45, 129

(56) References Cited

U.S. PATENT DOCUMENTS

| | | | |
|---|---|---|---|
| 4,709,978 | * 12/1987 | Jackel | 385/3 |
| 4,820,009 | * 4/1989 | Thaniyavarn | 385/2 |
| 5,267,336 | * 11/1993 | Sriram et al. | 385/2 |
| 5,638,468 | * 6/1997 | Tokano et al. | 385/3 |

FOREIGN PATENT DOCUMENTS

| | | |
|---|---|---|
| 2-259608 | 10/1990 | (JP) . |
| 3-48832 | 3/1991 | (JP) . |
| 4-128820 | 4/1992 | (JP) . |
| 4-270322 | 9/1992 | (JP) . |
| 5-17295 | 1/1993 | (JP) . |
| 5-2201 | 1/1993 | (JP) . |
| 5-100271 | 4/1993 | (JP) . |
| 6-222403 | 8/1994 | (JP) . |
| 7-5404 | 1/1995 | (JP) . |
| 7-64034 | 3/1995 | (JP) . |
| 7-191352 | 7/1995 | (JP) . |
| 8-5854 | 1/1996 | (JP) . |
| 9-80490 | 3/1997 | (JP) . |
| 10-3100 | 1/1998 | (JP) . |
| 94-214 | 1/2000 | (JP) . |

OTHER PUBLICATIONS

Japan, May 19, 1992, vol. 1, No. 8, pp. 521.

* cited by examiner

Primary Examiner—Hemang Sanghavi
Assistant Examiner—Sung Pak
(74) Attorney, Agent, or Firm—McGuireWoods LLP

(57) ABSTRACT

An optical circuit include a plurality of optical wave guides each having an electro-optic crystal such as $LiNbO_3$ or $LiTaO_3$ and a domain orientation different from the other waveguide. More specifically, in accordance with the invention, a portion of the circuit is inverted with respect to a domain. For instance, in an optical wave guide having a domain-inverted portion, if electric fields having the same orientation are applied to a plurality of portions which vary an index of refraction thereof, indexes of refraction are caused to vary in opposite polarities. Hence, it is possible to lower a voltage at which an optical device operates. If the present invention is applied to a Mach-Zehnder type phase shifter, it would be possible to accomplish push-pull operation, only if an electric field has one orientation. The invention further lower a voltage at which the phase shifter operates through a difference in an index of refraction between two optical wave guides.

12 Claims, 6 Drawing Sheets

OPTICAL CIRCUIT AND METHOD OF FABRICATING THE SAME

BACKGROUND OF THE INVENTION

1. Field of the Invention

The invention relates to an optical circuit and other optical elements, and more particularly to a wave guide type optical circuit including an optical wave guide formed on a substrate, and other optical elements.

2. Description of the Related Art

Optical communication systems recently put into practice, have a need for larger capacity and higher performances. In order to accomplish such optical communication, it is necessary to develop optically controllable elements operating at higher speed, such as a light modulator and an optical switch. Such optically controllable elements usually include a diffusion type optical wave guide having a substrate which is composed of electro-optic crystal such as $LiNbO_3$. (hereinafter, referred to simply as "LN") or $LiTaO_3$ (hereinafter, referred to simply as "LT"), and into which titanium, magnesium or proton is doped through a surface and thermally doped.

A plurality of wave guide type optical circuits each including the abovementioned diffusion type optical wave guide can be integrated into a single element by means of conventional photolithography, as described by Okayama et al. in "Shingaku Gihou", TSSE 94-214, or by Nishimoto et al. in "Optics" Vol. 1, No. 8, pp.521.

As a light modulator making use of quick response of electro-optic crystal, a Mach-Zehnder type high-speed light modulator has been put into practice. As an optical switch, there has been suggested a digital type optical switch where an output wave guide to which a light is coupled is selected among two or three output wave guides diverged in Y-shape, by concurrently applying voltages having different polarities to the output wave guides.

As another method of forming an optical wave guide constituting an optical circuit, Japanese Unexamined Patent Publications Nos. 2-259608, 7-64034, and 8-5854 have suggested a method of forming a ridge type optical wave guide by means of heteto-epitaxial growth where fused flux is used.

Though not for the purpose of forming an optical circuit, Japanese Unexamined Patent Publications Nos. 3-48832, 4-270322, 5-2201, 5-17295, and 5-100271 have suggested methods of partially inverting crystal orientation of LN or inverting domain in LN. In these methods, LN crystal is used to carry out pseudo-phase-matching in a secondary harmonics generating element.

Japanese Unexamined Patent Publication No. 7-5404 has suggested an electro-optic modulator for compensating for mismatching of a phase speed between an optical signal and a harmonics signal. This electro-optic modulator includes an optical wave guide formed on a ferroelectric substrate and coupled to an optical input terminal. A high frequency wave guide is formed on a substrate in order to apply an electric field to a region located adjacent to the optical wave guide and modulate an optical signal. The ferroelectric substrate includes a ferroelectric domain region for compensating for a difference in a phase within a modulation region. The ferroelectric domain region is periodically inversely rotated and normally rotated.

It is quite important to lower an operation voltage as much as possible in order to accomplish a practical light modulator or a practical optical switch both including LN therein. It is necessary to concurrently apply a voltage of about ±50V to two output wave guides in a digital type optical switch. It is advantageous to lower the voltage even to a small degree.

It is necessary in a Mach-Zehnder type optical switch to apply a voltage of about 50V to two phase shifters. Similar to the above-mentioned optical switch, it is advantageous to lower the voltage even to a small degree.

In a high-speed light modulator, a lower operation voltage could accomplish a driver circuit capable of operating at a higher speed. Accordingly, it is desired in a high-speed light modulator to lower an operation voltage as much as possible in order to drive a driver circuit at a higher speed.

SUMMARY OF THE INVENTION

It is an object of the present invention to lower an operation voltage in optical devices making use of electro-optic effect, such as a light modulator and an optical switch.

The present invention provides an optical device including optical wave guides each of which is composed of electro-optic crystal such as LN and LT and is domain-inverted in an electrode, where electric fields having the same orientation are applied to the optical wave guides.

As mentioned later, the present invention may be applied to various optical devices such as an optical circuit, a light modulator, or an optical switch.

In one aspect of the present invention, there is provided an optical circuit including a plurality of optical wave guides each composed of electro-optic crystal and each designed to have a domain orientation different from each other.

There is further provided a light modulator including two optical wave guides each composed of electro-optic crystal and cooperating with each other to constitute a phase shifter, the two optical wave guides being designed to have domain orientations inverted to each other.

There is still further provided an optical switch including two optical wave guides each composed of electro-optic crystal and cooperating with each other to constitute a phase shifter, the two optical wave guides being designed to have domain orientations inverted to each other.

There is yet further provided a digital type optical switch including (a) an input optical wave guide composed of electro-optic crystal, and (b) at least two output optical wave guides connected to the input optical wave guide in Y-shaped fashion. An index of refraction of each of the output optical wave guides is varied by an electric field to thereby select one output optical wave guide through which optical output is obtained, and the output optical wave guides are designed to have domain orientations inverted to each other.

There is still yet further provided a directional coupler type optical switch including a plurality of optical wave guides each composed of electro-optic crystal, optical wave guides located adjacent to each other being designed to have domain orientations inverted to each other.

In another aspect of the present invention, there is provided a method of fabricating an optical circuit including a plurality of optical wave guides each composed of electro-optic crystal and each designed to have a domain orientation different from each other, the method including the step of forming at least a part of the optical circuit by liquid phase epitaxy (LPE).

There is further provided a method of fabricating a light modulator including two optical wave guides each composed of electro-optic crystal and cooperating with each other to constitute a phase shifter, the two optical wave guides being designed to have domain orientations inverted to each other, the method including the step of forming at least a part of the light modulator by liquid phase epitaxy.

There is still further provided a method of fabricating an optical switch including two optical wave guides each composed of electro-optic crystal and cooperating with each other to constitute a phase shifter, the two optical wave guides being designed to have domain orientations inverted to each other, the method including the step of forming at least a part of the optical switch by liquid phase epitaxy.

There is yet further provided a method of fabricating a digital type optical switch including (a) an input optical wave guide composed of electro-optic crystal, and (b) at least two output optical wave guides connected to the input optical wave guide in Y-shaped fashion, an index of refraction of each of the output optical wave guides being varied by an electric field to thereby select one output optical wave guide through which optical output is obtained, the output optical wave guides being designed to have domain orientations inverted to each other, the method comprising the step of forming at least a part of the digital type optical switch by liquid phase epitaxy.

There is still yet further provided a method of fabricating a directional coupler type optical switch including a plurality of optical wave guides each composed of electro-optic crystal, optical wave guides located adjacent to each other being designed to have domain orientations inverted to each other, the method including the step of forming at least a part of the directional coupler type optical switch by liquid phase epitaxy.

In the optical circuit, light modulator, and optical switch in accordance with the present invention, if an electric field having a single orientation is applied to a plurality of portions which are to vary an index of refraction, it is possible to cause the indexes of refraction to vary in opposite polarities. Accordingly, for instance, if the present invention is applied to a Mach-Zehnder type phase shifter, it would be possible to accomplish push-pull operation merely by applying an electric field having one orientation thereto. In addition, it is possible to further lower a voltage at which the phase shifter operates, by doubling a difference in an index of refraction between two optical wave guides.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
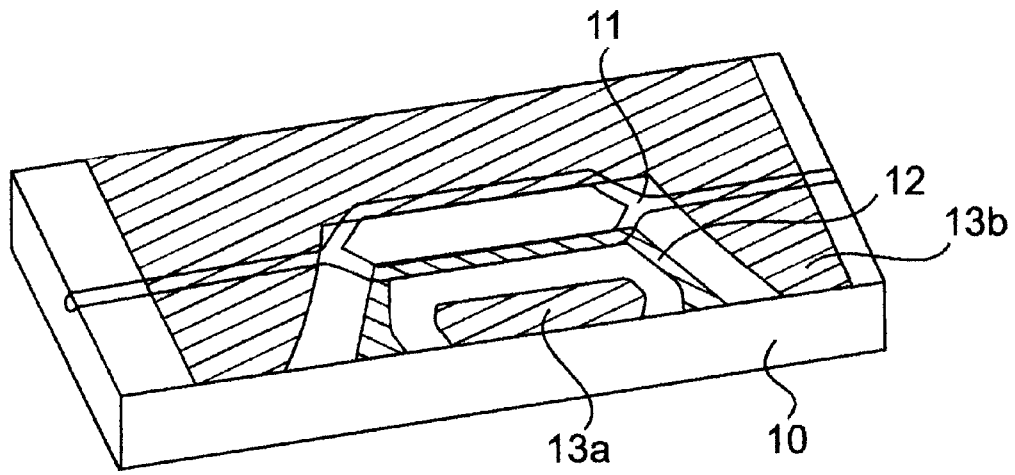
FIG. 1 is a perspective view illustrating an optical wave guide and an electrode in a Mach-Zehnder type light modulator.

FIG. 1 is a perspective view of an optical wave guide and an electrode in a typical Mach-Zehnder (hereinafter, referred to simply as "MZ") type light modulator.

A MZ type optical interference system 11 is formed on a LN substrate 10 by means of titanium (Ti) diffusion. A signal electrode 12 is connected to the MZ type optical interference system 11. Ground electrodes 13a and 13b are formed inside and outside the signal electrode 12 in such a way that the ground electrodes 13a and 13b surround the signal electrode 12.

When an electric field is applied to the illustrated MZ type light modulator, the applied electric field is distributed almost only below the signal electrode 12.

Figure 2:
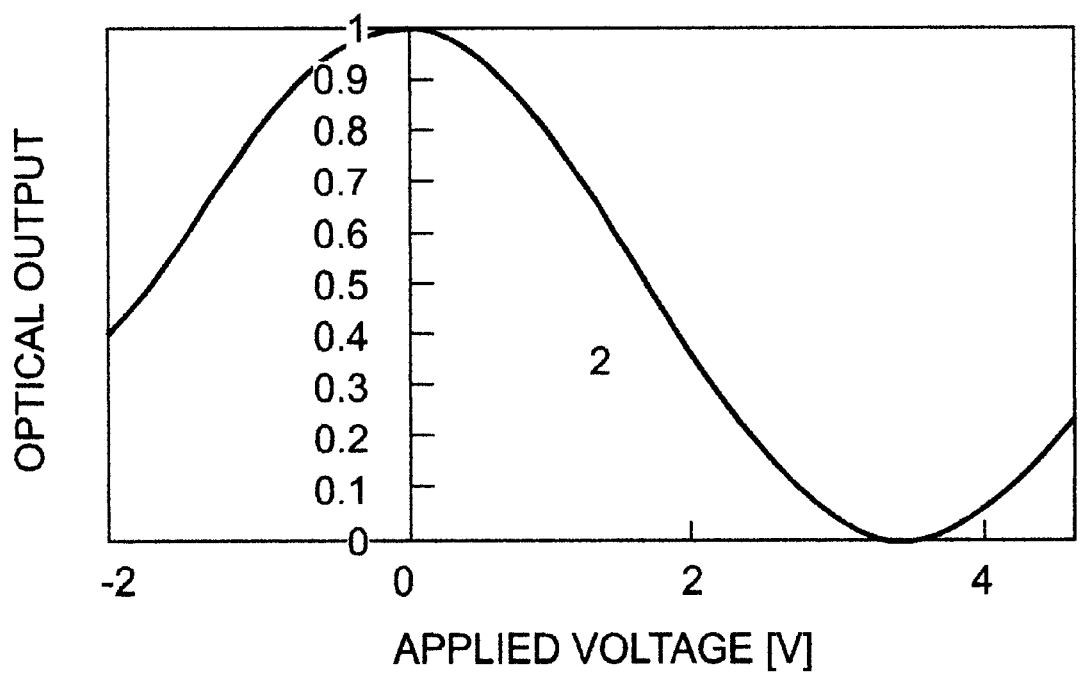
FIG. 2 is a graph showing a relation between optical output and an applied voltage in the Mach-Zehnder type light modulator illustrated in FIG. 1.

FIG. 2 is a graph illustrating a relation between an optical output and an applied voltage in an ordinary MZ type light modulator. In FIG. 2, an axis of ordinate indicates an optical output in a MZ type light modulator, and an axis of abscissa indicates a voltage applied to a MZ type light modulator. As is obvious in FIG. 2, an ordinary MZ type light modulator requires about 3.5V for operation thereof.

Figure 3:
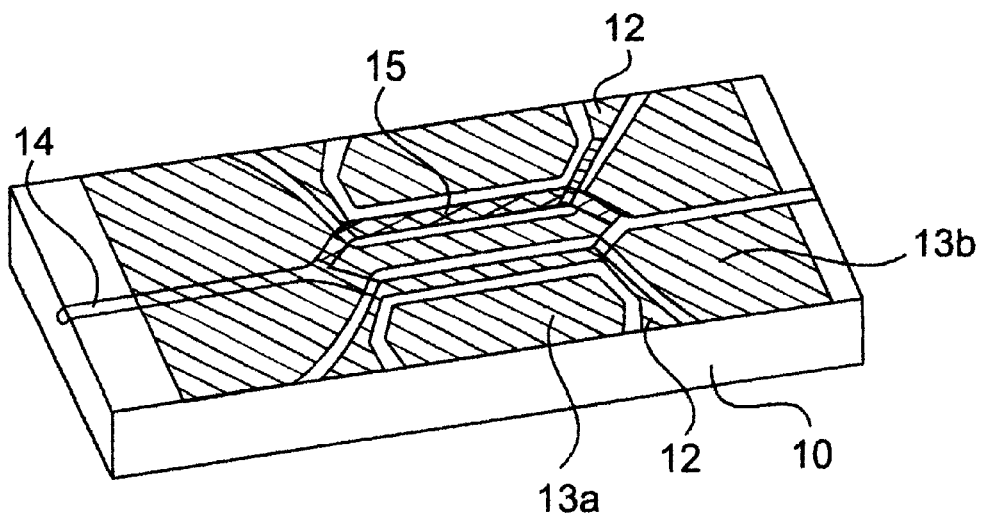
FIG. 3 is a perspective view illustrating an optical wave guide and an electrode of a Mach-Zehnder type light modulator in accordance with an embodiment of the present invention.

FIG. 3 illustrates an optical wave guide and an electrode in a MZ type light modulator in accordance with an embodiment of the present invention. A MZ type optical interference system 14 having two arms is formed on a LN substrate 10 by means of titanium (Ti) diffusion, for instance. Each of signal electrodes 12 is connected to a respective arm of the MZ type optical interference system 14 in opposite sides. Ground electrodes 13a and 13b are formed inside and outside the signal electrodes 12 in such a way that the ground electrodes 13a and 13b surround the signal electrodes 12.

In addition, a portion 15 in which a domain is inversely rotated is formed in one of the arms of a phase shifter constituted by the MZ type optical interference system 14.

When the MZ type light modulator in accordance with the embodiment is to be operated, voltages having the same phase are applied to the signal electrodes 12. Voltages having the same phase can be applied to the signal electrodes 12, for instance, by diverging a single wiring connected to the signal electrodes 12, into two portions outside or inside a chip.

If there is not formed the portion 15 in which a domain is inversely rotated, it would be necessary to apply voltages having opposite phases to the two signal electrodes 12. To this end, it will be necessary to form a specific circuit to do so. In addition, it would be also necessary to adjust electric signals to be transmitted to the signal electrodes 12 for the purpose of operating the MZ type light modulator at a high speed so that the electric signals have opposite phases.

For the above-mentioned reasons, it would be quite difficult to drive the MZ type light modulator at a high speed, if the domain-inverted portion 15 is not formed.

On the other hand, since voltages to be applied to the signal electrodes 12 are designed to have the same phase in the MZ type light modulator in accordance with the embodiment, it is not necessary to form a specific circuit for applying electric signals having opposite phases, to the signal electrodes 12.

Figure 4:
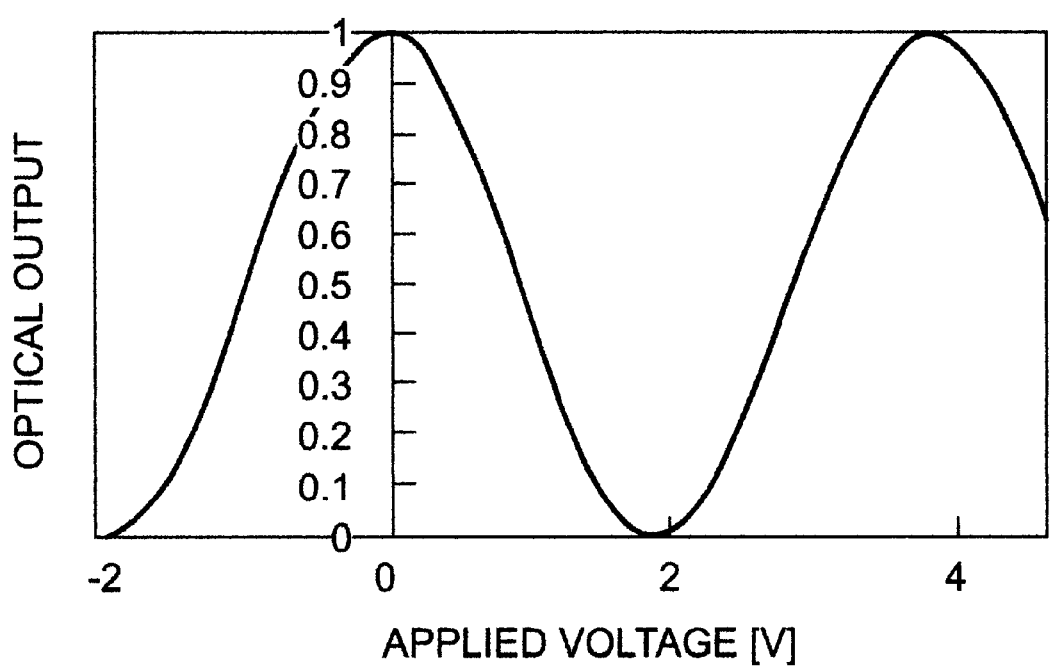
FIG. 4 is a graph showing a relation between optical output and an applied voltage in the Mach-Zehnder type light modulator illustrated in FIG. 3.

The MZ type light modulator in accordance with the embodiment can operate at about a half of an operation voltage in comparison with an ordinary MZ type light modulator illustrated in FIG. 1. FIG. 4 shows a relation between an optical output and an applied voltage in the MZ type light modulator in accordance with the present embodiment. As is obvious in FIG. 4, the operation voltage at which the MZ type light modulator operates is equal to about 1.9V, which is about a half of the operation voltage at which an ordinary MZ type light modulator illustrated in FIG. 1 can operate.

As discussed above, the MZ type light modulator in accordance with the present embodiment presents an advantage that an operation voltage at which the MZ type light modulator operates can be lowered without the use of a specific circuit.

The MZ type optical interference system 14 in the MZ type light modulator is comprised of a buried optical wave guide or a ridge type wave guide formed by liquid phase epitaxy (hereinafter, referred to simply as "LPE"). As an alternative, the MZ type optical interference system 14 may be comprised of a Ti diffusion type wave guide.

FIGS. 5A to 5F illustrate respective steps in a method of forming the domain-inverted portion 15 in the MZ type light modulator including a buried optical wave guide formed by means of LPE.

Figure 5A:
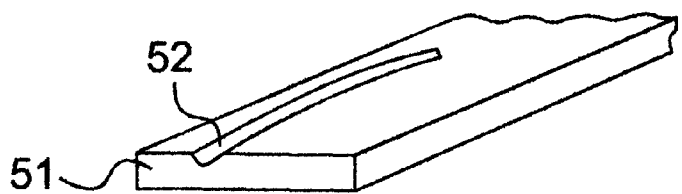
FIGS. 5A to 5F are perspective views of a Mach-Zehnder type light modulator, illustrating respective steps of a method of forming a portion in which a domain is inversely rotated.

First, as illustrated in FIG. 5A, a substrate 51 is formed at a surface thereof with a first groove 52. The substrate 51 is composed of LN, Mg doped LN, or Li $(Nb_xTa_{1-x})$ $O_3$ ($0 \leq X \leq 0.5$). The first groove 52 may be formed, for instance, by ion beam etching or wet etching in which proton exchange is used in combination.

Figure 5B:
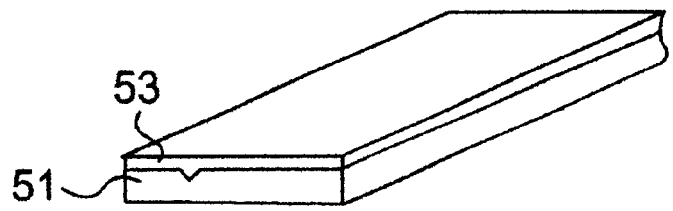

Then, as illustrated in FIG. 5B, a film 53 is formed on the substrate 51 so that the film 53 entirely covers the substrate 51. The film 53 is composed of core material having a domain orientation opposite to that of the substrate 51.

Figure 5C:
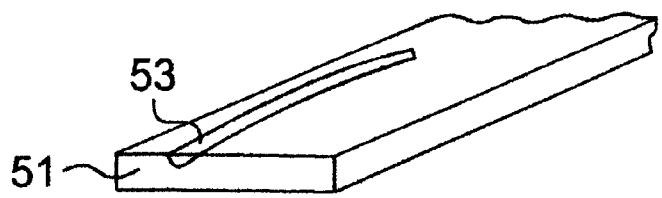

Then, as illustrated in FIG. 5C, the film 53 is removed so that the film 53 remains non-removed only in the first groove 52. Thus, the first groove 52 is filled with the core material, and accordingly, there is formed a portion in which a domain is inversely rotated.

Figure 5D:
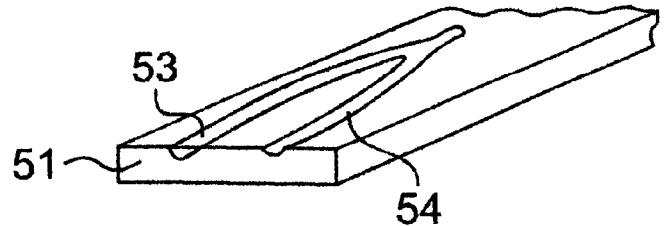

Then, as illustrated in FIG. 5D, the substrate 51 is formed at a surface thereof with a second groove 54 in order to form a portion in which a domain is normally rotates. For instance, the second groove 54 may be formed by ion beam etching, similarly to the first groove 52.

Figure 5E:
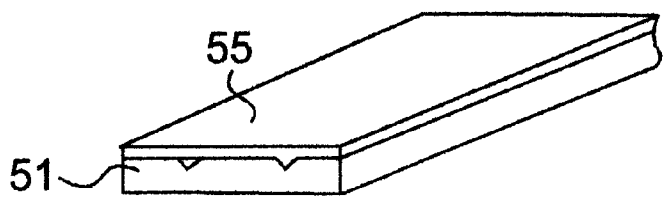

Then, as illustrated in FIG. 5E, a film 55 is formed over the substrate 51. The film 55 is composed of a material having the same domain orientation as that of the material of which the substrate 51 is composed.

Figure 5F:
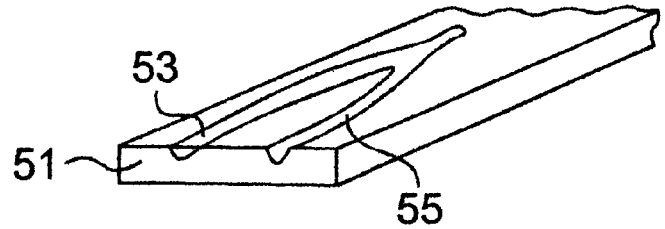

Then, as illustrated in FIG. 5F, the film 55 is removed so that the film 55 remains non-removed only in the second groove 54. Thus, the second groove 54 is filled with the core material, and accordingly, there is formed a portion in which a domain is normally rotated.

Domain orientations of the films 53 and 55 are controlled under the principle that since there is a difference in a coefficient of thermal expansion between the material of which the substrate 51 is composed and the materials of which the films 53 and 55 are composed, crystal is grown at a certain temperature in an orientation in which lattice constants become equal to each other. Accordingly, it is possible to control a domain orientation of the films 53 and 55 by appropriately setting a temperature of a crucible during growth of crystal.

It should be noted that the method illustrated in FIGS. 5A to 5F is just an example of a method of forming the portion 15 in which a domain is inversely rotated. In the above-mentioned method, though the portion in which a domain is inversely rotated is first formed, the portion in which a domain is normally rotated may be first formed. The portion in which a domain is normally or inversely rotated may be formed, for instance, by a method including the steps of forming a film having a desired composition and a desired crystal orientation, and etching the film, in place of the above-mentioned method including the steps of forming the first and second grooves 52 and 54, and filling the grooves 52 and 54 with the core materials 53 and 55.

The portion in which a domain is inversely rotated also by the steps of forming a wave guide having a certain domain orientation, by means of titanium diffusion, and inverting a domain in a selected region. For instance, a domain may be inverted by heating a portion of a wave guide up to a certain temperature with a high voltage being applied thereto, or by applying proton exchange to a portion of a wave guide to thereby cause the portion to be readily domain-inverted.

Figure 6:
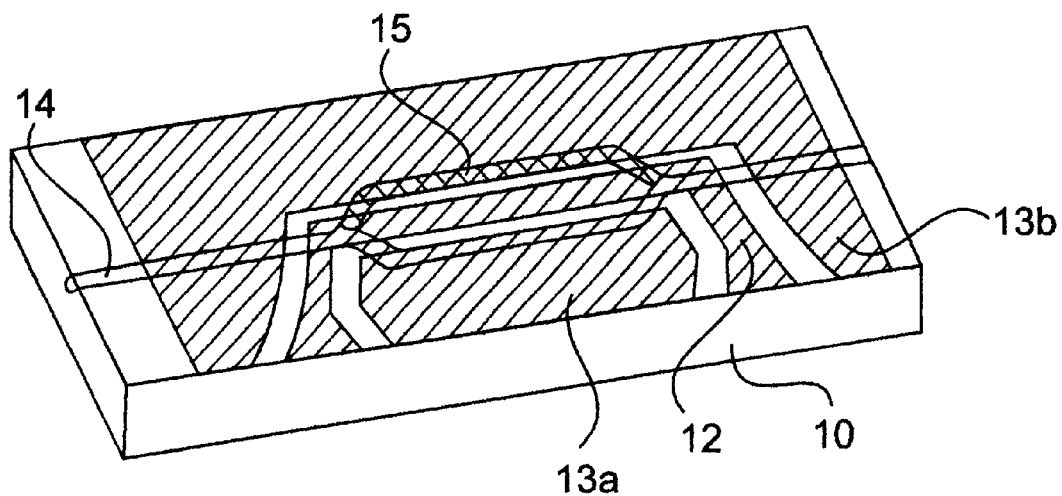
FIG. 6 is a perspective view illustrating an optical wave guide and an electrode of a Mach-Zehnder type light modulator in accordance with another embodiment of the present invention.

FIG. 6 illustrates another example of an electrode in the MZ type light modulator in accordance with the present embodiment.

A MZ type optical interference system 14 is formed on a LN substrate 10, for instance, by Ti diffusion. A signal electrode 12 is connected to the MZ type optical interference system 14. Ground electrodes 13a and 13b are formed inside and outside the signal electrode 12 in such a way that the ground electrodes 13a and 13b surround the signal electrode 12.

In addition, a portion 15 in which a domain is inversely rotated is formed in one of the arms of a phase shifter constituted by the MZ type optical interference system 14.

In the light modulator, the signal electrode 12 is formed at the center of a phase shifter, and the ground electrodes 13a and 13b partially overlap the arms of the phase shifter.

The portion 15 in which a domain is inversely rotated makes it possible for the light modulator to make push-pull operation, resulting in reduction in a voltage at which the light modulator operates.

Figure 7:
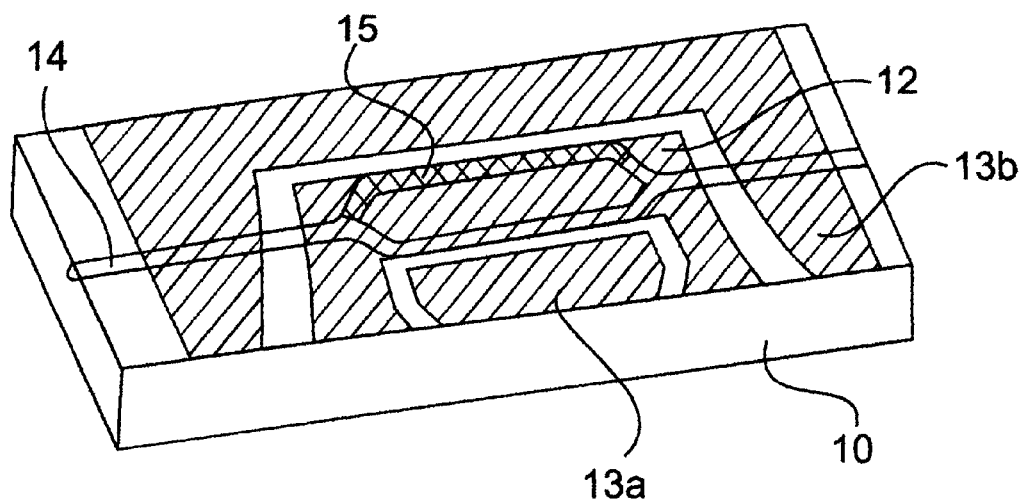
FIG. 7 is a perspective view illustrating an optical wave guide and an electrode of a Mach-Zehnder type light modulator in accordance with still another embodiment of the present invention.

FIG. 7 illustrates still another example of an electrode in the MZ type light modulator in accordance with the present embodiment.

The light modulator illustrated in FIG. 7 has the same structure as that of the light modulator illustrated in FIG. 6. Specifically, a MZ type optical interference system 14 is formed on a LN substrate 10. A signal electrode 12 is connected to the MZ type optical interference system 14. Ground electrodes 13a and 13b are formed inside and outside the signal electrode 12 in such a way that the ground electrodes 13a and 13b surround the signal electrode 12. A portion 15 in which a domain is inversely rotated is formed in one of the arms of a phase shifter constituted by the MZ type optical interference system 14.

In the light modulator illustrated in FIG. 7, the signal electrode 12 covers both two arms of a phase shifter and a region sandwiched between the two arms therewith. The ground electrodes 13a and 13b are formed close to the signal electrode 12.

Even in the light modulator having the above-mentioned structure, the portion 15 in which a domain is inversely rotated makes it possible for the light modulator to make push-pull operation, resulting in reduction in a voltage at which the light modulator operates.

The electrode of the light modulator, illustrated in FIG. 7 has almost the same structure as that of the electrode of the light modulator, illustrated in FIG. 6. However, the light modulator illustrated in FIG. 7 can be designed to have an optimal structure by appropriately selecting design parameters about a wave guide layout, such as a gap between the two arms of the phase shifter, and design parameters about the signal electrode 12, such as a ratio of a width of the signal electrode 12 to a gap between the arms.

In the above-mentioned embodiments and examples, the present invention is applied to a light modulator. The present invention is also applicable to an optical switch. For instance, it would be possible to lower a voltage at which a MZ type optical switch operates, with a structure of the signal electrode being kept the same as the electrode structure illustrated in FIGS. 3, 6 and 7, by deflecting Y-diversion of a MZ type light modulator into 3 dB coupler comprised of a directional coupler.

Figure 8:
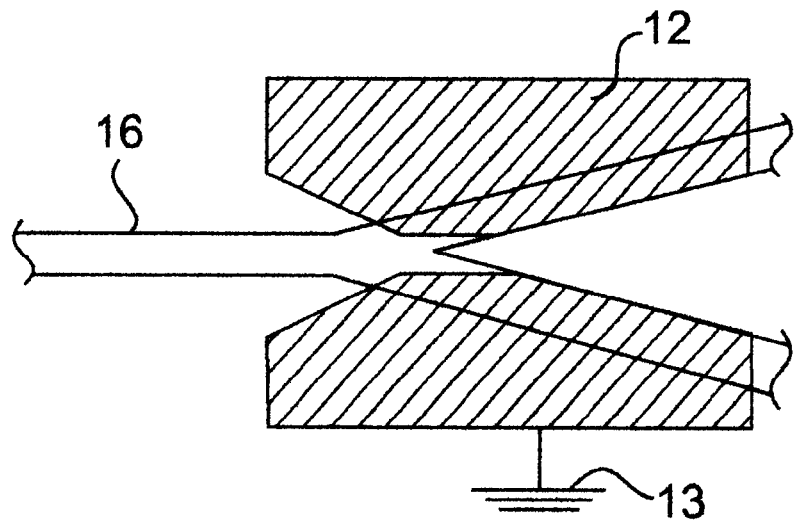
FIG. 8 is a plan view illustrating an optical wave guide and an electrode of a typical Y-shaped digital optical switch.

As an example of optical switches, there is a digital type optical switch including a Y-diverged wave guide. FIG. 8 illustrates a wave guide and electrodes in such a digital type optical switch. The illustrated digital type optical switch includes a Y-diverged wave guide 16, and a pair of electrodes 12 which surrounds a diversion point at which the wave guide 16 is diverged in Y-shaped fashion. One of the electrodes 12 is connected to a ground electrode 13.

In accordance with the digital type optical switch, it is possible to select an output port to which a light is coupled, by applying a voltage of about ±50V to the signal electrode 12, which voltage is based on the ground electrode 13.

Figure 9:
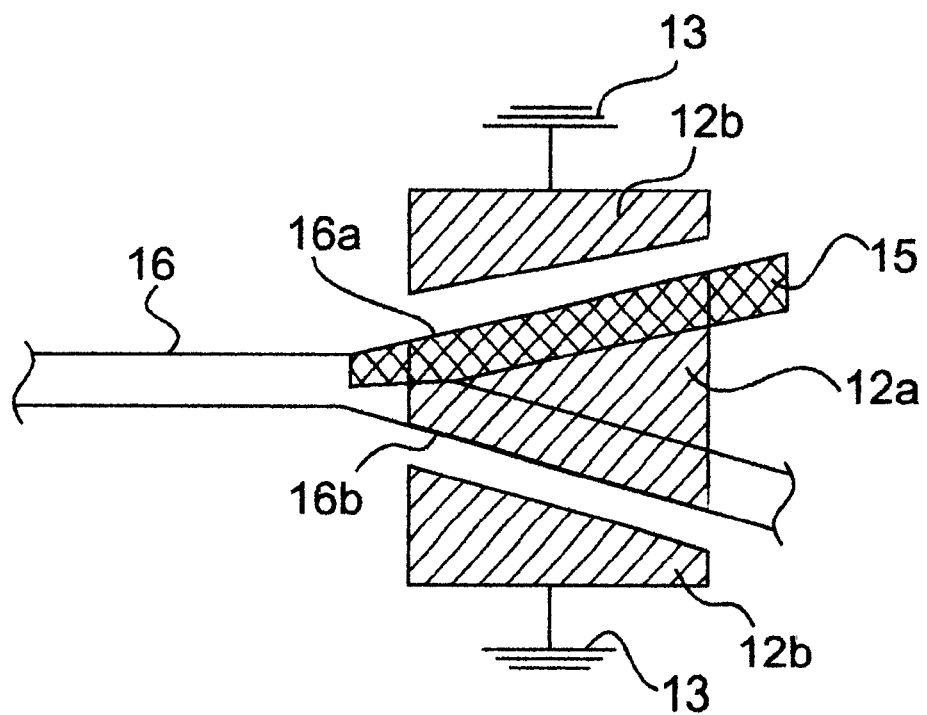
FIG. 9 is a plan view illustrating an optical wave guide and an electrode of a Y-shaped digital optical switch in accordance with an embodiment of the present invention.

FIG. 9 illustrates an optical switch in accordance with an embodiment of the present invention. The illustrated optical switch is comprised of a wave guide 16 having a Y-diverged portion constituting two arms 16a and 16b, a first signal electrode 12a formed between the arms 16a and 16b and covering the arms 16a and 16b therewith, a pair of second electrodes 12b which surrounds the arms 16a and 16b. Each of the electrodes 12b is connected to a ground electrode 13. A portion 15 in which a domain is inversely rotated is formed in the arm 16a.

In accordance with the Y-diverged optical switch, the portion 15 in which a domain is inverted, formed in the arm 16a of the wave guide 16, makes it possible to induce variation in an index of refraction in opposite directions in the arms 16a and 16b only by applying an electric field having the same orientation to the arms 16a and 16b. This results in reduction in a voltage at which the optical switch operates.

Figure 10:
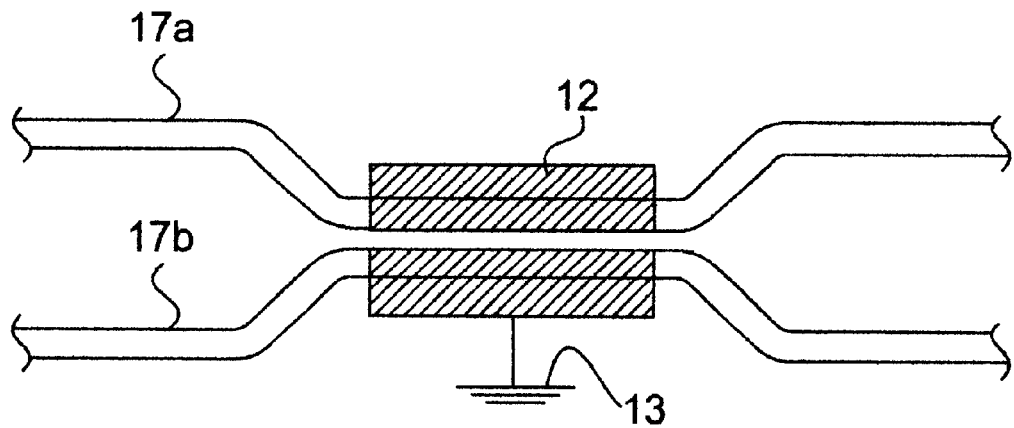
FIG. 10 is a plan view illustrating an optical wave guide and an electrode of a typical directional coupler type optical switch.

FIG. 10 illustrates a conventional wave guide and an electrode of an optical switch including a directional coupler. Two wave guides 17a and 17b are formed in parallel with each other. Signal electrodes 12 are formed in portions of the wave guides 17a and 17b where a gap between the wave guides 17a and 17b is designed to be smaller than other portions. One of the signal electrodes 12 is connected to the ground electrode 13.

Figure 11:
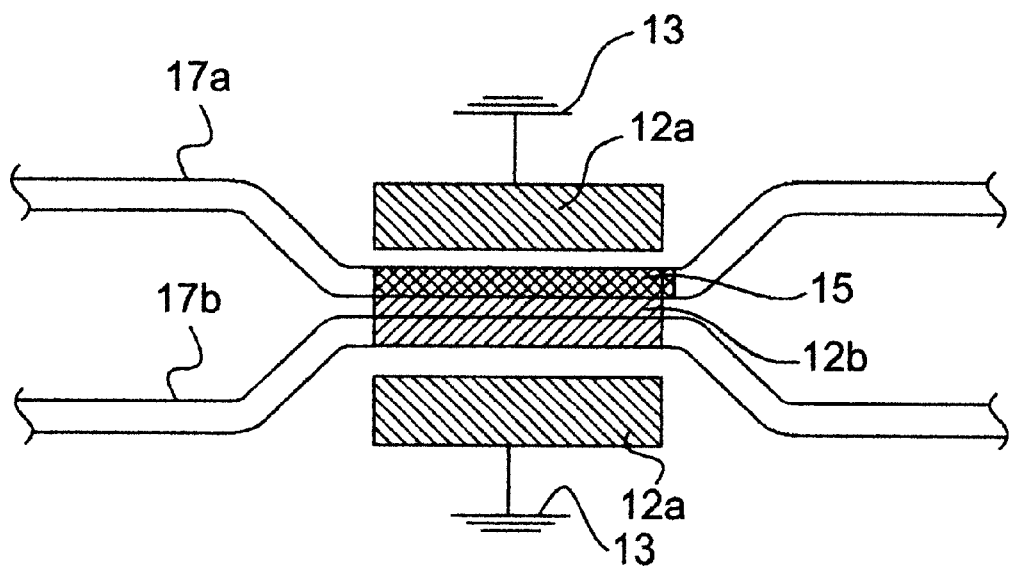
FIG. 11 is a plan view illustrating an optical wave guide and an electrode of a directional coupler type optical switch in accordance with an embodiment of the present invention.

FIG. 11 illustrates a wave guide and an electrode of an optical switch in accordance with an embodiment of the present invention. First signal electrodes 12a are formed outside portions of wave guides 17a and 17b where a gap between the wave guides 17a and 17b is designed to be smaller than other portions, and second signal electrode 12b is formed covering both the wave guides 17a and 17b therewith in the above-mentioned portions of the wave guides 17a and 17b. The first signal electrodes 12a are both connected to ground electrodes 13. The wave guide 17a is formed in the above-mentioned portion with a portion 15 in which a domain is inversely rotated.

In accordance with the optical switch, the portion 15 in which a domain is inverted, formed in the wave guide 17a, makes it possible to induce variation in an index of refraction in opposite directions in the wave guides 17a and 17b only by applying an electric field having the same orientation to the wave guides 17a and 17b. This results in reduction in a voltage at which the optical switch operates.

In accordance with the present invention, a portion of an optical device is inverted with respect to a domain. For instance, in an optical wave guide having a domain-inverted portion, if electric fields having the same orientation are applied to a plurality of portions which are to vary an index of refraction thereof, indexes of refraction are caused to vary in opposite polarities. Hence, it is possible to lower a voltage at which an optical device operates. For instance, if the present invention is applied to a Mach-Zehnder type phase shifter, it would be possible to accomplish push-pull operation, only if an electric field having one orientation is applied thereto. In addition, it is possible to further lower a voltage at which the phase shifter operates, by making a difference in an index of refraction between two optical wave guides.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-37201 filed on Feb. 19, 1998 including specification, claims, drawings and summary is incorporated herein by reference in its entirety.

What is claimed is:

1. An optical circuit, comprising:
    a plurality of optical wave guides each including an electro-optic crystal, said plurality of optical wave guides including a first wave guide and a second wave guide, said first wave guide having a domain orientation different from said second optical wave guide;
    a first signal electrode overlapping one of said first wave guide and said second wave guide;
    a second signal electrode overlapping the other of said first wave guide and said second wave guide; and
    means for applying voltages of a same phase to said first signal electrode and said second signal electrode.

2. The optical circuit of claim 1, wherein said means applies said voltages of a same phase by diverging a single wire connected to said first signal electrode and said second signal electrode into two portions inside or outside of said optical circuit.

3. The optical circuit of claim 2, further comprising:
a ground electrode surrounding at least one of said first signal electrode and said second signal electrode.

4. The optical circuit of claim 3, wherein said ground electrode does not overlap either of said first wave guide and said second wave guide.

5. A digital type optical switch comprising:
  (a) an input optical wave guide including an electro-optic crystal;
  (b) at least two output optical wave guides connected to said input optical wave guide in Y-shaped fashion;
  (c) a signal electrode overlapping both of said two output optical wave guides, said signal electrode applying a voltage for varying an index of refraction of said output optical wave guides to thereby select one of said output optical wave guides through which an optical output is obtained, and
wherein said output optical wave guides have domain orientations inverted with respect to each other.

6. The optical switch of claim 4, further comprising:
a pair of ground electrodes surrounding a point of diversion of said two output wave guides.

7. The optical switch of claim 5, further comprising:
first and second ground electrodes formed adjacent to said output wave guides but not overlapping said wave guides.

8. An optical circuit, comprising:
a first wave guide and a second wave guide, said first wave guide having a domain orientation different from said second optical wave guide;
first and second Y-shaped optical fiber portions, said first Y-shaped optical fiber portion connecting first ends of said first and second optical wave guides and said second Y-shaped optical fiber portion connecting second ends of said first and second optical wave guides; and
a signal electrode located at a non-overlapping center position between said first wave guide and said second wave guide, said signal electrode being the only signal electrode in said circuit.

9. The optical circuit of claim 8, further comprising:
a first ground electrode which overlaps said first wave guide; and
a second ground electrode which overlaps said second wave guide.

10. A method of modulating light, comprising:
providing a light modulator which includes two optical wave guides each having an electro-optic crystal and a domain orientation different from the other wave guide, said light modulator further including a first signal electrode overlapping one of the two optical wave guides and a second signal electrode overlapping the other of the two optical wave guides; and
applying voltages having the same phase to said first signal electrode and said second signal electrode.

11. The method of claim 10, wherein said applying step includes applying said voltages of a same phase by diverging a single wire connected to said first signal electrode and said second signal electrode into two portions inside or outside of said optical circuit.

12. A light modulator, including:
two optical wave guides each including an electro-optic crystal, said two optical wave guides cooperating with each other to constitute a phase shifter and having domain orientations inverted with respect to each other;
first and second Y-shaped optical fiber portions, said first Y-shaped optical fiber portion connecting first ends of said two optical waveguides and said second Y-shaped optical fiber portion connecting second ends of said two optical waveguides; and
a first signal electrode overlapping said two optical wave guides.

* * * * *